(12) United States Patent
Gisler et al.

(10) Patent No.: US 8,127,631 B2
(45) Date of Patent: Mar. 6, 2012

(54) ROTOR ASSEMBLY INCLUDING STRAIN RELIEF FEATURE

(75) Inventors: Gary Lynwood Gisler, Granbury, TX (US); Porter Davis, Anthem, AZ (US); Roger Nagel, Peoria, AZ (US); Dennis Wayne Smith, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 781 days.

(21) Appl. No.: 12/212,401

(22) Filed: Sep. 17, 2008

(65) Prior Publication Data

US 2010/0064828 A1 Mar. 18, 2010

(51) Int. Cl.
| | |
|---|---|
| *G01C 19/16* | (2006.01) |
| *G01C 19/20* | (2006.01) |
| *G01C 19/38* | (2006.01) |
| *G01C 19/54* | (2006.01) |
| *G01C 19/06* | (2006.01) |
| *G01C 19/34* | (2006.01) |

(52) U.S. Cl. ............... 74/5 R; 74/5.4; 74/5.7; 74/5.9
(58) Field of Classification Search ............ 74/5 R–5 F
See application file for complete search history.

(56) References Cited

U.S. PATENT DOCUMENTS

| | | | | |
|---|---|---|---|---|
| 3,043,147 | A | * | 7/1962 | Will, Jr. .................... 74/5 R |
| 3,742,769 | A | | 7/1973 | Crutcher et al. |
| 3,851,933 | A | | 12/1974 | Jacobson |
| 3,955,858 | A | | 5/1976 | Poubeau |
| 4,242,917 | A | | 1/1981 | Bennett et al. |
| 4,343,203 | A | * | 8/1982 | Jacobson et al. ............ 74/5 R |
| 4,690,007 | A | * | 9/1987 | Moles et al. ............... 74/5.12 |
| 5,419,212 | A | | 5/1995 | Smith |
| 6,135,392 | A | | 10/2000 | Wakugawa |
| 6,305,647 | B1 | | 10/2001 | Defendini et al. |
| 6,995,529 | B2 | * | 2/2006 | Sibley ....................... 318/161 |
| 7,000,308 | B2 | | 2/2006 | Fiske et al. |

* cited by examiner

*Primary Examiner* — Tisha Lewis
(74) *Attorney, Agent, or Firm* — Ingrassia Fisher & Lorenz, P.C.

(57) ABSTRACT

A rotor assembly is provided for deployment within the inner gimbal assembly of a control moment gyroscope (CMG). In one embodiment, the rotor assembly includes a rotor shell, a rotor shaft fixedly coupled to the rotor shell, and a rotor rim. The rotor rim includes an annular body and a strain relief member. A first end portion of the strain relief member is fixedly coupled to the annular body, and a second end portion of the strain relief member is fixedly coupled to the rotor shell to form a rim-shell joinder interface. The strain relief member has a flexibility sufficient to reduce the mechanical stress experienced by the rim-shell joinder interface during operation of the CMG.

19 Claims, 3 Drawing Sheets

ROTOR ASSEMBLY INCLUDING STRAIN RELIEF FEATURE

TECHNICAL FIELD

The present invention relates generally to control moment gyroscopes and, more particularly, to a rotor assembly including one or more strain relief features suitable for deployment within the inner gimbal assembly of a control moment gyroscope.

BACKGROUND

Control moment gyroscopes (CMGs) are commonly employed in satellite attitude control systems. A generalized CMG may include a main CMG housing and an inner gimbal assembly (IGA), which is mounted within the main CMG housing for rotation about a gimbal axis. The IGA includes, amongst other components, a rotor assembly, a spin motor, and a rotor housing. The rotor assembly includes a rotor rim, which may be disposed between first and second hemispherical rotor shell pieces. The rotor rim is welded to the first and second rotor shell pieces along first and second circumferential rim-shell weld joints, respectively. Collectively, the rotor rim, the first rotor shell piece, and the second rotor shell piece form a generally spherical body through which a rotor shaft is disposed. Opposing ends of the rotor shaft are each received by a spin bearing mounted within an annulus provided within the rotor housing. During operation, the spin motor rotates the rotor assembly about a spin axis at a relatively high rate of speed. The IGA is, in turn, selectively rotated about the gimbal axis, which is generally perpendicular to the rotor spin axis, by an actuator (e.g., a torque module assembly) mounted within the main CMG housing. When the IGA is "gimbaled" in this manner, a controlled torque is generated about an output axis normal to the spin and gimbal axes due to the mass and the rotational rate of the rotor assembly and, in particular, of the rotor rim. This generated torque is imparted to the host satellite through the CMG mount interface (e.g., an annular flange bolted to a mounting surface provided on the exterior of the satellite). Thus, by selectively rotating the IGA about the gimbal axis, the satellite's attitude may be adjusted as desired.

Traditionally, weight has been a primary driver in CMG design. However, as CMG weight has been continually reduced, a certain emphasis has shifted to the development of CMGs capable of achieving relatively high inertial levels within a streamlined (low volume) CMG envelope. Limitations associated with conventional rotor assemblies have hindered the development of such high inertia, low volume CMGs. As a key limitation, conventional rotor assemblies are generally unable to withstand the significant rotational speeds, sometimes exceeding 10,000 revolutions per minute, required to achieve the desired momentum levels while maintaining adequate structural integrity. This is due, in large part, to the significant mechanical stress experienced by the rotor assembly's rim-shell weld joints during high speed operation of the CMG.

Considering the above, it would be desirable to provide a rotor assembly for deployment within the inner gimbal assembly of a control moment gyroscope that maintains its structural integrity at high rotational speeds by reducing or redirecting the mechanical stress experienced by the rim-shell weld joints. Preferably, embodiments of such a rotor assembly would have a relatively streamlined (low volume) envelope. Other desirable features and characteristics of the present invention will become apparent from the subsequent Detailed Description and the appended claims, taken in conjunction with the accompanying drawings and this Background.

BRIEF SUMMARY

A rotor assembly is provided for deployment within the inner gimbal assembly of a control moment gyroscope (CMG). In one embodiment, the rotor assembly includes a rotor shell, a rotor shaft fixedly coupled to the rotor shell, and a rotor rim. The rotor rim includes an annular body and a strain relief member. A first end portion of the strain relief member is fixedly coupled to the annular body, and a second end portion of the strain relief member is fixedly coupled to the rotor shell to form a rim-shell joinder interface. The strain relief member has a flexibility sufficient to reduce the mechanical stress experienced by the rim-shell joinder interface during operation of the CMG.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
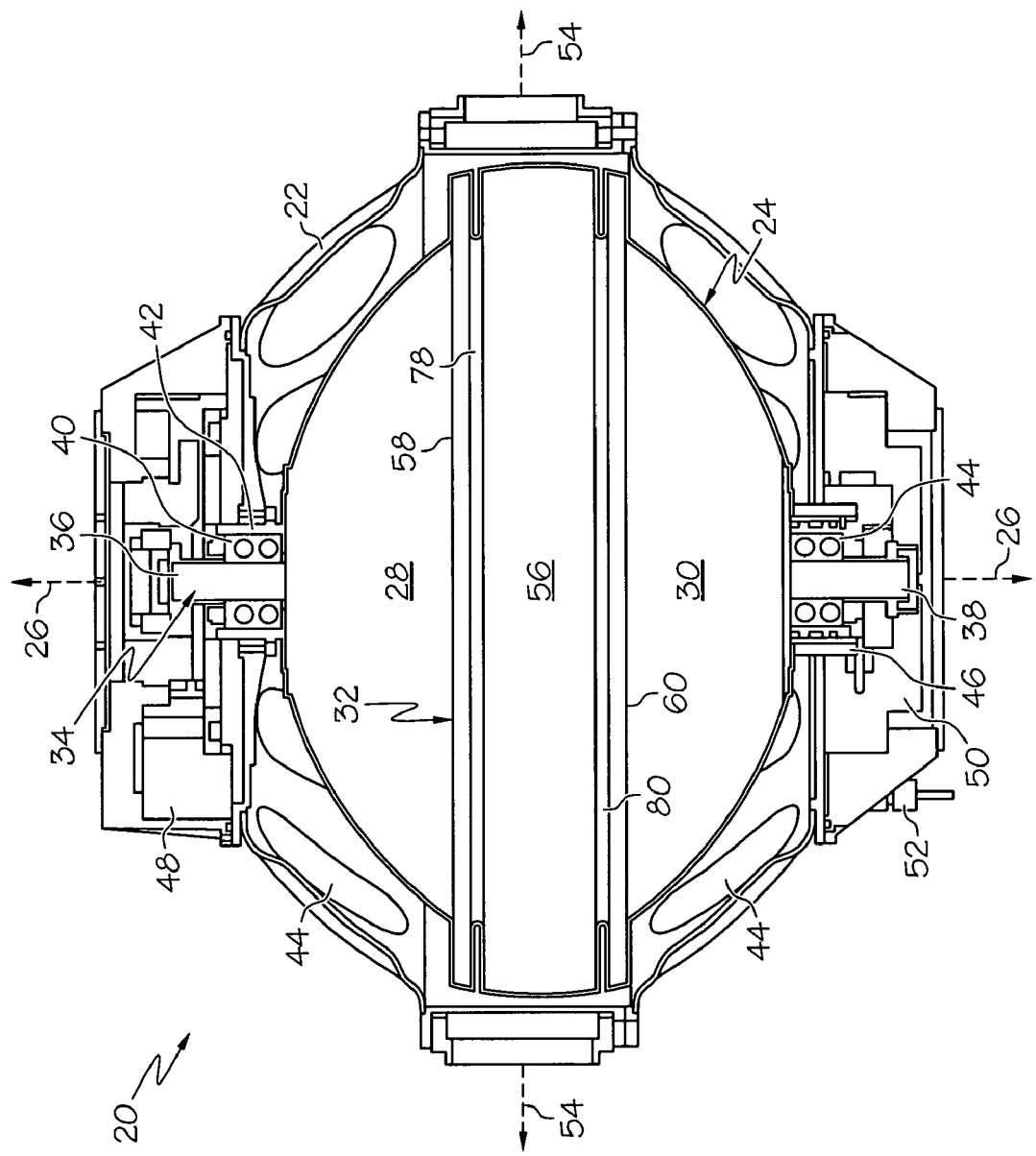
FIG. 1 is a cutaway view of an inner gimbal assembly including a rotor assembly having first and second strain relief features in accordance with a first exemplary embodiment.

FIG. 1 is a cutaway view of an inner gimbal assembly (IGA) 20 of a control moment gyroscope (CMG) suitable for deployment within a satellite attitude control system. IGA 20 includes a rotor housing 22 (shown in cutaway) and a rotor assembly 24, which is mounted within rotor housing 22 for rotation about a spin axis 26. Rotor assembly 24 includes first and second rotor shell pieces 28 and 30, a rotor rim 32, and a rotor shaft 34. In the illustrated exemplary embodiment, rotor shell pieces 28 and 30 are each generally hemi-spherical in shape and, when joined together via rotor rim 32, cooperate to form a generally spherical rotor shell; however, it will be appreciated that rotor shell pieces 28 and 30 may assume other geometries in alternative embodiments. Rotor rim 32 is fixedly coupled to rotor shell pieces 28 and 30, which are, in turn, fixedly coupled to rotor shaft 34 utilizing, for example, a welding technique (e.g., electronic beam welding). Opposing end portions 36 and 38 of rotor shaft 34 extend through rotor shell pieces 28 and 30, respectively, and are each received within an annulus provided within rotor housing 22. To facilitate the rotation of rotor assembly 24 within rotor housing 22, one or more spin bearing assemblies may also be disposed within each annulus between an inner surface of rotor housing 22 and an outer surface of rotor shaft 34. For example, and with reference to the orientation shown in FIG. 1, a fixed duplex bearing cartridge and duplex spin bearing 40 may be disposed between end portion 36 of rotor shaft 34 and a first tubular mounting structure 42 provided within an upper portion of rotor housing 22; and a floating bearing cartridge and duplex spin bearing 44 may likewise be disposed between end portion 38 of rotor shaft 34 and a second tubular mounting structure 46 provided within a lower portion of rotor housing 22.

A spin motor 48 is mounted within an upper portion of rotor housing 22 and mechanically engages end portion 36 of rotor shaft 34. When energized by a controller (not shown), spin motor 48 imparts a torque to rotor shaft 34 to rotate rotor assembly 24 about spin axis 26. A resolver 50, or other such rotational sensor, may be disposed within a lower portion of rotor housing 22 to monitor one or more rotational characteristics (e.g., rotational rate, angular position, etc.) and, perhaps, to provide commutation for spin motor 48. In addition to the above-described components, IGA 20 may further include various other components (e.g., one or more vent valves 52) that are standard in the industry and that not described herein in the interests of concision.

IGA 20 is configured to be rotatably mounted within a control moment gyroscope (not shown). During operation, an actuator (e.g., a torque module assembly) disposed within the CMG selectively rotates IGA 20 about a gimbal axis 54. Due to the mass and the rotational rate of rotor assembly 24 and, specifically, of rotor rim 32, the rotation of IGA 20 about gimbal axis 54 results in the generation of a substantial torque about an output axis normal to spin axis 26 and gimbal axis 54. This generated torque may then be imparted to a host satellite (not shown) to adjust the attitude thereof. To provide an efficient load path from rotor rim 32 to the main housing of the CMG and to the host spacecraft, the stiffness of rotor housing 22 may be increased by forming a plurality of depressions therein as generally shown in FIG. 1 at 44.

During operation of IGA 20, rotor assembly 24 may rotate at relatively high rotational speeds; e.g., speeds approaching or exceeding 10,000 revolutions per minute. When rotor assembly 24 is rotated at such high rotational speeds, the outer diameter of rotor rim 32 increases due to centrifugal forces. As rotor assembly 24 is rotated about axis 26 and as IGA 20 is selectively rotated about gimbal axis 54, significant mechanical stress is placed on rotor rim 32, rotor shell piece 28, and rotor shell piece 30. In conventional rotor assembly architectures, a relatively large portion of this mechanical stress is carried by the circumferential weld joints uniting rotor rim 32 with rotor shell pieces 28 and 30. The mechanical stress limit of the rim-shell weld joints is considerably less than that of the parent material of rotor rim 32 and the other components of rotor assembly 24. Thus, in conventional rotor assembly architectures, the maximum rotational rate of the rotor assembly is typically undesirably limited by the stress limit of the rim-shell weld joint. To overcome this limitation and to permit rotor assembly 24 to be rotated at high rotation speeds, rotor assembly 24 is provided with one or more strain relief features as described more fully below.

Figure 3:
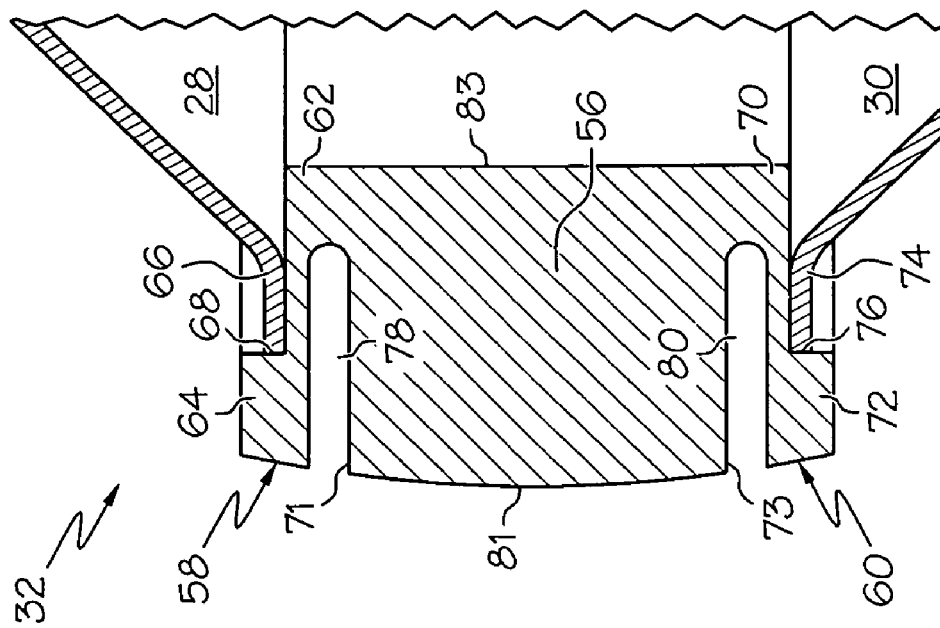
FIG. 3 is an axial cross-sectional view of a portion of the rotor assembly shown in FIGS. 1 and 2 taken along line 3-3 (labeled in FIG. 2) and illustrating one manner in which the rotor rim may be welded between the rotor shell pieces.
Figure 2:
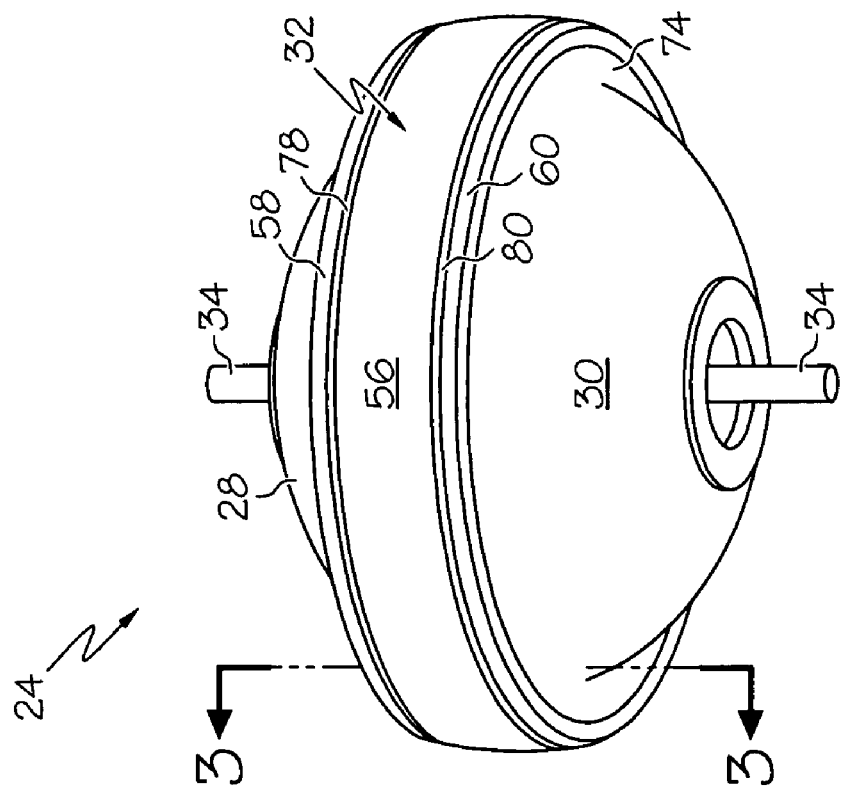
FIG. 2 is an isometric view of the exemplary rotor assembly shown in FIG. 1.

FIG. 2 is an isometric view of rotor assembly 24, and FIG. 3 is an axial cross-sectional view of a portion of rotor assembly 24 taken along line 3-3 (labeled in FIG. 2) illustrating one manner in which rotor rim 32 may be welded to rotor shell pieces 28 and 30. Referring collectively to FIGS. 1-3, rotor rim 32 includes three main components, namely, an annular body 56, a first strain relief member 58, and a second strain relief member 60. As labeled in FIG. 3, strain relief member 58 includes a first end portion 62 and a second end portion 64 substantially opposite first end portion 62. First end portion 62 is fixedly coupled to annular body 56, and second end portion 64 is fixedly coupled to a radial lip 66 provided around rotor shell piece 28. Although any suitable coupling means may be utilized to form the rim-shell joinder interface, it is preferred that second end portion 64 is welded to radial lip 66 of rotor shell piece 28 to form a first circumferential rim-shell weld joint 68. Notably, second end portion 64 is welded to radial lip 66 of rotor shell piece 28 only along the circumference thereof and not along the radial face thereof. Stated differently, and with reference to the orientation shown in FIG. 3, only the outer vertical wall of lip 66 and the inner vertical wall of second end portion 64 are welded together. As does strain relief member 58, strain relief member 60 includes a first end portion 70 and a second opposing end portion 72. First end portion 70 is fixedly coupled to annular body 56, and second end portion 72 is welded to a radial lip 74 provided around rotor shell piece 30 to form a second circumferential rim-shell weld joint 76. Again, it should be noted that second end portion 72 is welded to radial lip 74 of rotor shell piece 30 only along the circumference thereof. In the illustrated exemplary embodiment, first end portion 62 of strain relief member 58 is fixedly coupled to (e.g., integrally formed with) a first radial face 71 of annular body 56, and first end portion 70 of strain relief member 60 is fixedly coupled to (e.g., integrally formed with a second opposing radial face 73 of annular body 56; however, in alternative embodiments, the end portions of strain relief members 58 and 60 may be fixedly coupled to other portions (e.g., an inner circumferential portion) of annular body 56.

Although by no means necessary, it is preferred that first end portion 62 of strain relief member 58 and first end portion 70 of strain relief member 60 are each integrally formed with annular body 56. That is, strain relief member 58, strain relief member 60, and annular body 56 may be machined or otherwise produced from a unitary annular body. In this respect, a first annular groove 78 may be machined into rotor rim 32 to define strain relief member 58 and radial face 71 of annular body 56 (FIG. 3), and a second annular groove 80 may likewise be machined into rotor rim 32 to define strain relief member 60 and opposing face 73 of annular body 56 (FIG. 3). As shown in FIG. 3, annular groove 78 resides between strain relief member 58 and annular body 56 and extends radially outward from an outer circumferential surface 81 of annular body 56 toward an inner circumferential surface 83 thereof. Similarly, annular groove 80 resides between strain relief member 60 and annular body 56 and extends from outer circumferential surface 81 toward inner circumferential surface 83 of annular body 56. Annular grooves 78 and 80 are each exposed through the outer circumferential surface of rotor rim 32. Strain relief member 58 thus resides adjacent radial face 71 of annular body 56, and end portion 64 is axially separated therefrom by annular groove 78; and strain relief member 60 resides adjacent opposing radial face 73 of annular body 56, and end portion 72 is axially separated therefrom by annular groove 80. Advantageously, annular grooves 78 and 80 may be machined into rotor rim 32 utilizing readily-available tooling and known manufacturing techniques.

In the exemplary embodiment illustrated in FIGS. 1-3, strain relief members 58 and 60 each assume the form of a radial flange that axially overlaps and is substantially co-axial with annular body 56. Stated more generally, annular body 56 resides substantially between strain relief members 58 and 60. As can be seen in FIG. 3, strain relief members 58 and 60 each have an axial cross-sectional that is substantially J-shaped. Furthermore, the intermediate portions of strain relief members 58 and 60 are elongated and each have a relatively thin cross-sectional profile. The intermediate portions of strain relief members 58 and 60 consequently have a flexibility or compliance that permits strain relief members 58 and 60 to deflect and thereby redirect mechanical stress from circumferential weld joints 68 and 76 to the parent material of annular body 56. The parent material of annular body 56 preferably comprises a high strength metal or alloy (e.g., a high strength steel), and has a mechanical stress limit that is considerably greater than that of either weld joint 68 or of weld joint 76. Thus, during operation of the CMG in which IGA 20 (FIG. 1) is deployed, strain relief members 58 and 60 serve to reduce the mechanical stress experienced by the rim-shell joinder interface. Strain relief members 58 and 60 thus permit rotor assembly 24 to be rotated at higher rotational speeds without comprising the structural integrity thereof. In so doing, strain relief members 58 and 60 enable the CMG in which IGA 20 is deployed to achieve increased inertial levels. Furthermore, due to the axially overlapping configuration of strain relief members 58 and 60 and annular body 56, the volume of the envelope of rotor assembly 24, and therefore of IGA 20, is reduced.

Figure 5:
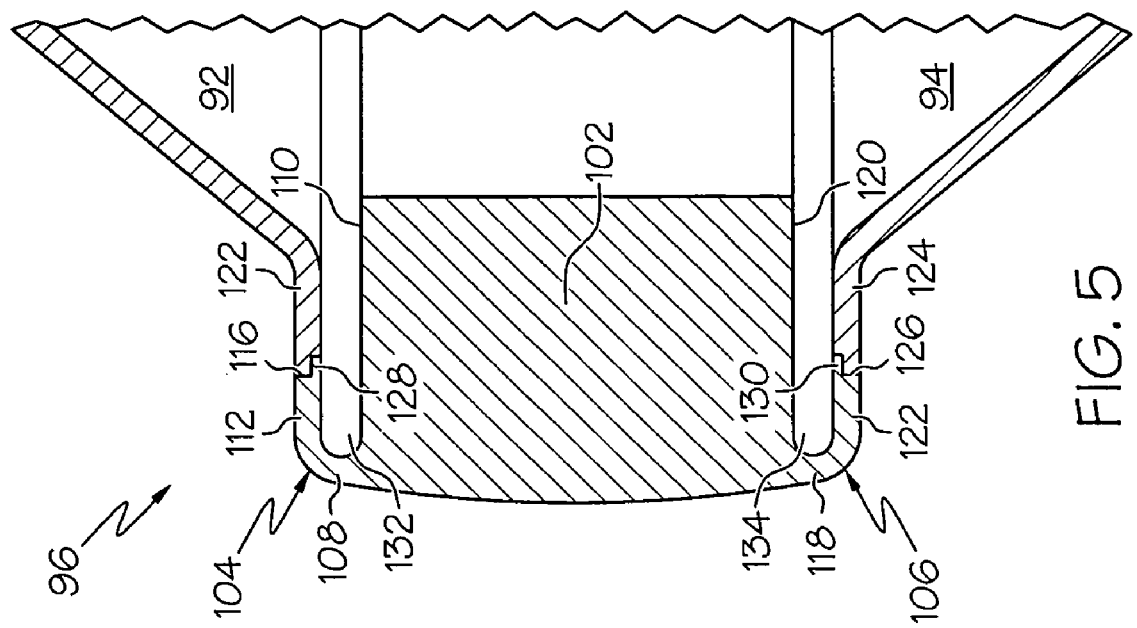
FIG. 5 is an axial cross-sectional view of a portion of the rotor assembly shown in FIG. 4 taken along line 5-5 (labeled in FIG. 4) and illustrating one manner in which the rotor rim may be welded between the rotor shell pieces.
Figure 4:
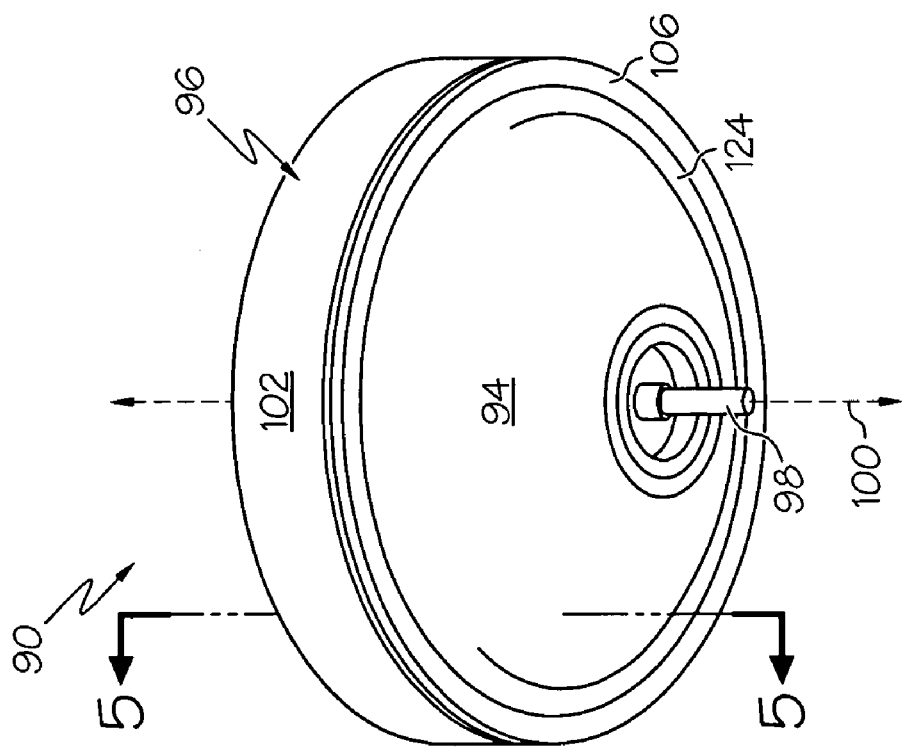
FIG. 4 is an isometric view of a rotor assembly having first and second strain relief features in accordance with a second exemplary embodiment.

Strain relief members may assume any suitable geometry having a flexibility sufficient to reduce the mechanical stress experienced by the rim-shell joinder interface (e.g., rim-shell weld joints 68 and 76 shown in FIG. 3) during CMG operation. Further emphasizing this point, FIG. 4 is an isometric view of a rotor assembly 90 in accordance with a second exemplary embodiment, and FIG. 5 is a cross-sectional view of a portion of rotor assembly 90 taken along line 5-5 (labeled in FIG. 4). In many respects, rotor assembly 90 is similar to rotor assembly 24 discussed above in conjunction with FIGS. 1-3. For example, rotor assembly 90 includes a first hemispherical rotor shell piece 92 (hidden from view in FIG. 4), a second hemi-spherical rotor shell piece 94, a rotor rim 96, and a rotor shaft 98. Collectively, rotor shell pieces 92 and 94 form a generally spherical rotor shell through which rotor shaft 98 extends. Rotor shell pieces 92 and 94, rotor rim 96, and rotor shaft 98 are fixedly coupled (e.g., welded) together to form a substantially rigid body that may be mounted within a rotor housing (e.g., rotor housing 22 shown in FIG. 1) for rotation about a spin axis 100.

Referring specifically to FIG. 5, rotor rim 96 includes three main components: (i) an annular body 102, (ii) a first strain relief member 104, and (iii) a second strain relief member 106. First strain relief member 104 includes a first end portion 108 fixedly coupled to, and preferably integrally formed with, a first radial face 110 of annular body 102. Substantially opposite first end portion 108, first strain relief member 104 further includes a second end portion 112 welded to a radial lip 114 of rotor shell piece 92 along a first circumferential rim-shell weld joint 116. Second strain relief member 106 likewise includes a first end portion 118 fixedly coupled to, and preferably integrally formed with, a second opposing radial face 120 of annular body 102; and a second end portion 122 welded to a radial lip 124 of rotor shell piece 94 along a second circumferential rim-shell weld joint 126. In contrast to rotor rim 32 wherein strain relief members 58 and 60 connected to an inner radial portion of annular body 56 (FIG. 3), strain relief members 104 and 106 of rotor rim 96 each connect to outer radial portion of annular body 102. Also in contrast to rotor rim 32, a first annular shelf 128 is formed (e.g., machined) in second end portion 110 of strain relief member 104, and a second annular shelf 130 is formed (e.g., machined) in second end portion 122 of strain relief member 106. When rotor assembly 90 is assembled, radial lip 122 of rotor shell piece 92 and radial lip 124 of rotor shell piece 94 seat on shelves 128 and 130, respectively. In this manner, shelves 128 and 130 serve as guide features that assist in achieving an appropriate alignment of rotor shell piece 92, rotor shell piece 94, and rotor rim 96 prior to welding. Alignment features (e.g., one or more annular shelves) may also be machined into radial lip 122 of rotor shell piece 92 and/or radial lip 124 of rotor shell piece 94 in alternative embodiments.

As were the strain relief members of rotor rim 32 (FIGS. 1-3), the strain relief members of rotor rim 96 (i.e., strain relief members 104 and 106) are at least partially defined by first and second annular grooves (i.e., grooves 132 and 134 shown in FIG. 5) formed in rotor rim 96. However, in this particular example, annular grooves 132 and 134 extend radially inward from an inner surface of rotor rim 96 toward an outer surface of rotor rim 96. Thus, as may be appreciated by referring to FIG. 4, annular grooves 132 and 134 are not exposed through the outer circumferential surface of rotor rim 96. As was the case previously, strain relief members 104 and 106 may each assume the form of a radial flange that overlaps axially with annular body 102. Furthermore, and as indicated in FIG. 5, strain relief members 104 and 106 may each have an axial cross-section that is substantially J-shaped. Again, strain relief members 104 and 106 reside substantially adjacent to radial faces 110 and 120 of annular body 102, respectively, and are axially separated therefrom by annular grooves 132 and 134.

As shown most clearly in FIG. 5, strain relief members 104 and 106 each have a relatively thin axial cross-section. As a result, strain relief members 104 and 106 each have a certain compliance or flexibility. Due to this flexibility, strain relief members 104 and 106 deflect during CMG to redirect the mechanical stress experienced by rim-shell weld joints 116 and 126 to the parent material of rotor rim 96. As explained above, this reduces the mechanical stress experienced by the rim-shell joinder interface and enables rotor assembly 90 to maintain its structural integrity at increased rotational speeds not suitable for conventional rotor assemblies. Also as noted above, the axially overlapping configuration of annular body 102, strain relief member 104, and strain relief member 106 permits the volume of the envelope of rotor assembly 90 to be reduced.

In view of the above, it should be appreciated that multiple exemplary embodiments of a rotor assembly have been provided that is suitable for deployment within the inner gimbal assembly of a control moment gyroscope and that maintains its structural integrity at increased rotational speeds by reducing the mechanical stress experienced by the rim-shell joinder interface (e.g., the rim-shell weld joint). It should further be appreciated that, in above-described exemplary embodiments, the rotor assembly is packaged within a relatively streamlined (low volume) envelope. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodi-

What is claimed is:

1. A rotor assembly for deployment within the inner gimbal assembly of a control moment gyroscope (CMG), the rotor assembly comprising:
   a rotor shell;
   a rotor shaft fixedly coupled to the rotor shell;
   a rotor rim, comprising:
      an annular body; and
      a strain relief member having a first end portion fixedly coupled to the annular body and having a second end portion fixedly coupled to the rotor shell to form a rim-shell joinder interface, the strain relief member having a flexibility sufficient to reduce the mechanical stress experienced by the rim-shell joinder interface during operation of the CMG; and
   an annular groove formed in the rotor rim between the annular body and the strain relief member.

2. A rotor assembly according to claim 1 wherein the first end portion is substantially opposite the second end portion.

3. A rotor assembly according to claim 1 wherein the strain relief member is integrally formed with the annular body.

4. A rotor assembly according to claim 1 wherein the strain relief member is fixedly coupled to an inner portion of the annular body, and wherein the annular groove extends radially inward from an outer surface of the rotor rim.

5. A rotor assembly according to claim 1 wherein the strain relief member is fixedly coupled to an outer portion of the annular body, and wherein the annular groove extends radially outward from an inner surface of the rotor rim.

6. A rotor assembly according to claim 1 wherein the second end portion is welded to the rotor shell along a circumference thereof, and wherein the rim-shell joinder interface comprises a circumferential rim-shell weld joint.

7. A rotor assembly according to claim 1 wherein the strain relief member comprises a radial flange.

8. A rotor assembly according to claim 7 wherein the axial cross-section of the radial flange is substantially J-shaped.

9. A rotor assembly according to claim 7 wherein the annular body includes a first radial face, and wherein the radial flange resides adjacent the first radial face.

10. A rotor assembly according to claim 7 wherein the radial flange is substantially co-axial with the annular body.

11. A rotor assembly according to claim 7 wherein the radial flange axially overlaps with the annular body.

12. A rotor assembly for deployment within the inner gimbal assembly of a control moment gyroscope (CMG), the rotor assembly comprising:
   a first rotor shell piece;
   a second rotor shell piece;
   a rotor shaft fixedly coupled to the first rotor shell piece and to the second rotor shell piece; and
   a rotor rim comprising first and second annular grooves extending radially from a first surface of the rotor rim toward a second surface of the rotor rim, the first and second annular grooves defining first and second strain relief members mechanically coupling the rotor rim to the first rotor shell piece and to the second rotor shell piece, respectively.

13. A rotor assembly according to claim 12 wherein the rotor rim comprises:
   an annular body having a first radial face and having a second radial face substantially opposite the first radial face;
   a first strain relief member, comprising:
      a first end portion fixedly coupled to the annular body proximate the first radial face; and
      a second end portion substantially opposite the first end portion, the second end portion welded to the first rotor shell piece; and
   a second strain relief member, comprising:
      a first end portion fixedly coupled to the annular body proximate the second radial face; and
      a second end portion substantially opposite the first end portion, the second end portion welded to the second rotor shell piece.

14. A rotor assembly according to claim 13 wherein the second end portion of the first strain relief member is axially separated from the first radial face by the first annular groove, and wherein the second end portion of the second strain relief member is axially separated from the second radial face by the second annular groove.

15. A rotor assembly according to claim 14 further comprising an annular shelf formed in the second end portion of the first strain relief member and abutting the first rotor shell piece.

16. A rotor assembly for deployment within the inner gimbal assembly of a control moment gyroscope (CMG), the rotor assembly comprising:
   a first rotor shell piece;
   a second rotor shell piece;
   a rotor shaft fixedly coupled to the first rotor shell piece and to the second rotor shell piece; and
   a rotor rim, comprising:
      an annular body having a first radial face and having a second radial face substantially opposite the first radial face;
      a first strain relief member having a first end portion fixedly coupled to the annular body proximate the first radial face and having a second end portion welded to the first rotor shell piece to form a first rim-shell weld joint; and
      a second strain relief member having a first end portion fixedly coupled to the annular body proximate the second radial face and having a second end portion welded to the second rotor shell piece to form a second rim-shell weld joint, the first strain relief member and the second strain relief member each having a flexibility sufficient to reduce the mechanical stress experienced by the first rim-shell weld joint and the second rim-shell weld joint during operation of the CMG.

17. A rotor assembly according to claim 16 wherein the first strain relief member and the second strain relief member extend axially away from the first radial face and the second radial face, respectively, of the annular body.

18. A rotor assembly according to claim 16 wherein the first strain relief member and the second strain relief member comprise a first radial flange and a second radial flange, respectively, each integrally formed with the annular body.

19. A rotor assembly according to claim 18 wherein the annular body resides between the first radial flange and the second radial flange.

* * * * *